Feb. 20, 1962     O. C. SMITH     3,021,880
SAWMILL SET WORKS

Filed Aug. 6, 1959     3 Sheets-Sheet 1

INVENTOR
OWEN C. SMITH
BY
ATTORNEY

Feb. 20, 1962   O. C. SMITH   3,021,880
SAWMILL SET WORKS
Filed Aug. 6, 1959   3 Sheets-Sheet 3

INVENTOR
OWEN C. SMITH
BY
ATTORNEY

3,021,880
SAWMILL SET WORKS
Owen C. Smith, 1235 N. Church St.,
Richland Center, Wis.
Filed Aug. 6, 1959, Ser. No. 832,062
13 Claims. (Cl. 143—118)

This invention relates to sawmill set works and more particularly to a set works which can be remotely controlled by a sawyer by means of hydraulic and electric servo-mechanisms.

A set of works of a saw mill in the mechanism which is used by a sawyer to incrementally offset logs on a sawmill carriage toward the mill saw to enable cuttings of planks and slabs to be made from logs. The utility of a set works mechanism is dependent upon the ease and speed with which a sawyer can accurately and reproducibly cut dimensioned lumber from logs.

The precision with which logs can be set and held on a saw carriage is proportional to the amount of lost motion that may be present in a set works mechanism. Frictional abrasion and wear of mechanical components such as of gears, sockets, screw threads and the like enable variable motion of the components to occur and result in poor product quality of lumber which may be cut on a mill.

A set works operator has conventionally been required to ride on the sawmill carriage while operating the set works. This arrangement is dangerous to life and limb and is wasteful of labor. The set works of this invention enables the sawyer to control the set works and eliminates the need of a carriage rider.

It is an object of this invention to provide a sawmill set works which can be operated by a sawyer who is remotely located from the carriage of the set works.

It is another object of this invention to provide a servo-mechanism which can be easily operated and accurately controlled for use with a sawmill set works.

It is a further object of this invention to provide a set works which can be controlled unitarily with the carriage apparatus and the log dogging apparatus and which can be operated through the simple manipulation of one control handle.

Other objects will become apparent from the drawings and from the following detailed description in which it is intended to illustrate the applicability of the invention without thereby limiting its scope to less than all equivalents which will be apparent to one skilled in the art. In the drawings like reference numerals refer to like parts and:

Figure 1:
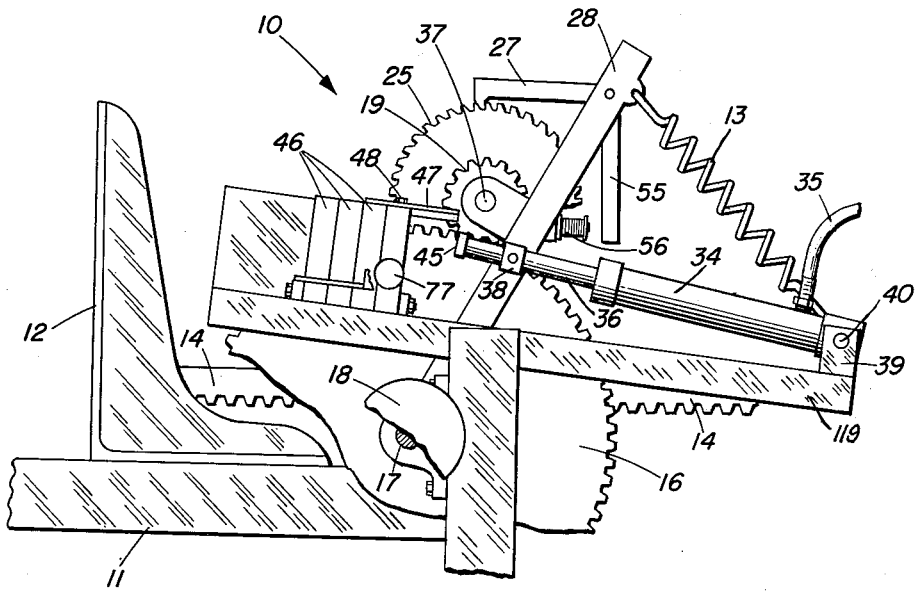
FIGURE 1 is a sectional side elevation of a sawmill set works of this invention.
Figure 2:
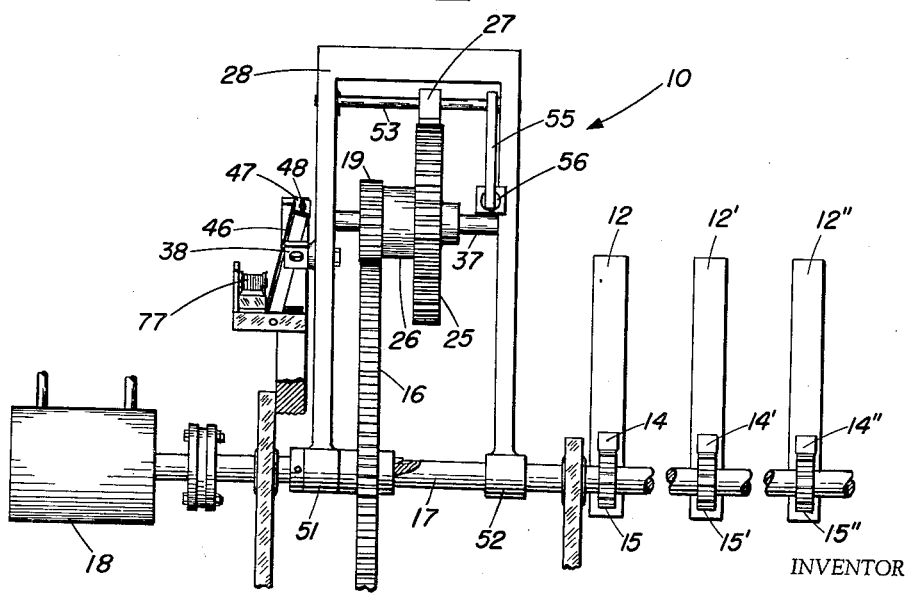
FIGURE 2 is a sectional front elevation of the device of FIGURE 1.

Referring now to FIGURES 1 and 2, there is shown a set works designated generally as 10 suitable for mounting on a sawmill carriage of conventional design. Log positioning knees 12 can be moved transversely (left and right as shown in FIGURE 1) across a carriage (not shown) in a direction perpendicular to the direction of movement of the carriage, upon suitable guide means in a manner which is conventional to sawmills. Racks 14 may be affixed to log positioning knees 12 and may be actuated to operably bias log positioning knees 12 from right to left as shown in FIGURE 1 across a carriage to incrementally offset a log toward the mill saw, or knees 12 can be biased from left to right as shown in FIGURE 1 to retract knees 12 and enable placement of another log to be made on the sawmill carriage. Log positioning knees 12 may act in unison and may be actuated by racks 14. Pinions 15 may be rotated to actuate racks 14 and may be fixedly attached to set shaft 17. Drive gear 16 and fluid motor 18 may also be fixedly attached to set shaft 17 and may be rotated simultaneously with pinions 15. Yoke 28 may be mounted on set shaft 17 by means of bearings 51 and 52 and may be rotated independently of set shaft 17. Set shaft 17 with pinions 15 thereon may be rotated incrementally in a counter-clockwise direction as viewed in FIGURE 1 to operably offset racks 14 and log positioning knees 12 into successive positions of closer adjacency to a mill saw. Rotation of set shaft 17 in this direction may be operably accomplished by actuating drive gear 16 in a manner which will be hereafter described. Counter-rotation of set shaft 17, i.e. in a clockwise direction as viewed in FIGURE 1, may be accomplished by actuating hydraulic motor 18 on set shaft 17 in a clockwise direction of rotation. A symmetrical arrangement of set works components may also be utilized and could be operated in a manner equivalent to the arrangement described.

When it may be desired to offset logs toward a mill saw, yoke 28 may be rotated in a counter-clockwise direction (FIGURE 1) by actuation received from hydraulic piston 36 through pivotal collar 38 on yoke 28. Idler gear 19 is restrained from being rotated by movement of yoke 28 in this direction by overriding clutch 26 and restraining gear 25 which may be mounted so as to rotate freely on shaft 37 together with idler gear 19. Idler gear 19 and restraining gear 25 may each be fixedly attached to portions of overriding clutch 26 which are independently interrotatable in such a manner that idler gear 19 can be rotated in a clockwise direction as viewed in FIGURE 1 independent of restraining gear 25, but cannot be so rotated in a counter-clockwise direction.

Clutch 26 and restraining gear 25 may be adapted from the overriding clutch and gear of an automobile electric starter mechanism or from other conventional mechanisms. The clutch from an automobile electric starting unit may be comprised of two concentric circular race members having an annular space therebetween. Disposed alternately in the annulus between the circular race members may be fixed wedge shaped inserts and freely movable spherical ball members. The spherical ball members may be frictionally immobilized between inclined wedge insert faces and a circular race member surface when the clutch mechanism is rotated in one direction of rotation, and may loosely abut against radially oriented faces of wedge inserts when the clutch mechanism is rotated in the opposite direction of rotation. Clutch 26 may be of any other conventional configuration which will render the connection between idler gear 19 and restraining gear 25 operable for the purpose of coupling together the two gears in one direction of rotation and enabling independent movement of the two gears in the opposite direction of rotation.

Restraining gear 25 may be restrained from being rotated by movement of yoke 28 by pawl 27 being brought into engaging relation therewith. Pawl 27 may be pivotally attached to yoke 28 by shaft 53 with arm extension 55 on pawl 27 depending into operable adjacency with solenoid 56 thereby enabling removal of pawl 27 from engagement with restraining gear 25 to be made by actuation of solenoid 56. Counter-clockwise direction of rotation as viewed in FIGURE 1 of idler gear 19, clutch 26 and restraining gear 25 may then occur and drive gear 16 may then be rotated in a clockwise direction free from any restraining force.

To operate the set works illustrated in FIGURES 1 and 2, hydraulic fluid may be admitted into hydraulic cylinder 34 through hydraulic line 35 thereby causing hydraulic piston 36 to be extendably displaced, and rotate yoke 28 about set shaft 17, thereby rotating drive gear 16 by means of restraining gear 25, clutch 26 and idler gear 19. No one of the latter three components is free to rotate about shaft 37 when pawl 27 is operably engaged with restraining gear 25. Piston rod 36 may operably be extended until ram head 45 on piston rod 36 abuts against one of adjustable stops 46 and is restrained from further movement. Piston rod 36 remains in this position until pressure is released in hydraulic cylinder 34 whereupon tension of spring 13 retracts yoke 28 and piston rod 36. When yoke 28 is rotated clockwise by piston rod 36, idler gear 19 is rotated freely and independently of restraining gear 26 and is traversed over drive gear 16 while in meshing relation therewith. Thus, drive gear 16 and set shaft 17 may be operably rotated counter-clockwise (FIGURE 1) by operation of piston 34 and yoke 28, but may not be counter rotated thereby.

Figure 5:
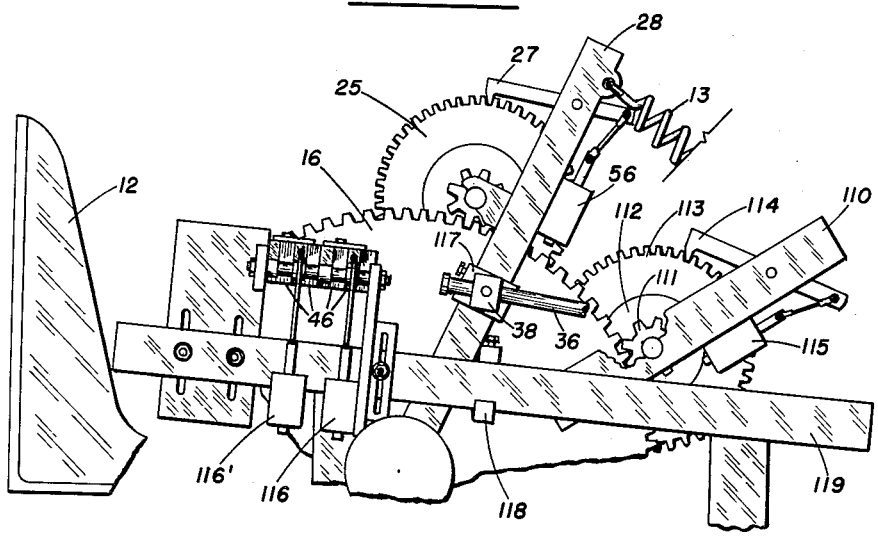
FIGURE 5 is a sectional side elevation of another set works of this invention.

A unique and utilitarian feature of the set works illustrated in FIGURES 1 and 2, resides in the provision of frame member 119 on which both hydraulic cylinder 34 and adjustable stops 46 may be mounted. The bending moments and the mechanical strains that may arise from the force of piston rod 36 abutting against adjustable stops 46 can be transmitted only to frame member 119. No other portion of the sawmill can be stressed by the action of the prime moving force or by the reaction of adjustable stops 46 thereto. Thus, when drive gear 16 may be rotatively moved by yoke 28 being traversed through an arcuate path, no radial force component arises in drive gear 16. The frame of the sawmill cannot be subjected to stress when the set works is actuated by extending piston rod 36 against adjustable stops 46, the entire action and reaction of the operation being confined to frame member 119. Therefore, log positioning knees 12 may be advanced to offset a log into the mill saw without occasioning strain in the sawmill structural members from other sources than that of the torque of set shaft 17. Frame member 119 rests upon a singular support, and the support member cannot have a bending moment or tensile or compressive stresses imparted to it from frame member 119. It has been found that the precision and accuracy with which cuttings can be made is increased by insulating the mill from the acting and reacting force components of the prime moving mechanism. As shown in FIGURE 5 two frame members may be used to support frame member 119 of that figure, however, when such an arrangement is used it is requisite that frame member 119 be of a dimension stouter than that dictated by normal design criteria so that strain will be minimized and will not be transmitted to the rest of the set works frame and to the carriage.

To enable placement of another log to be made upon the sawmill carriage it is necessary to retract log positioning knees 12 and rotate set shaft 17 and drive gear 16 clockwise as viewed in FIGURE 1. Hydraulic motor 18 may be actuated to rotate set shaft 17 in a clockwise direction (FIGURE 1) thereby to move knees 12. Pawl 27 must be disengaged from restraining gear 25 by solenoid 56 thereby enabling set shaft 17 to be freely rotated and log positioning knees 12 to be operably retracted.

The sawing cycle may be repeatedly performed to cut uniformly dimensioned boards and slabs from a log by first selecting the appropriate adjustable stop 46 and then actuating hydraulic piston 36 to advance knees 12. The saw log can then be cut by passing the sawmill carriage past the mill saw, and the carriage may be returned to unactuated position in preparation for another pass. Upon release of pressure in hydraulic cylinder 34 tension in spring 13 acts to return yoke 28 and piston rod 36 to unactuated position. During the return movement of yoke 28 under actuation from spring 13, idler gear 19 can rotate free of restraint from restraining gear 25 by means of over-riding clutch 26 therebetween, and is enabled to be rotatably traversed over drive gear 16 without causing rotative movement of drive gear 16. The set works can be repeatedly incrementally indexed in this manner until log positioning knees 12 have completely displaced a log into the saw. The carriage can then be readied for another log by retracting knees 12 under actuation from hydraulic motor 18 while pawl 27 is lifted from engagement with restraining gear 25.

Adjustable stops 46 may be operably selected and be removed from alignment with ram end 45 by means of solenoid 77. Several adjustable stops 46 can be connected together by operably fastening bar 47 by bolt 48 across selected stops and then be operably removed from alignment through actuation of solenoid 77.

Adjustable stop 46 may preferably be of such widths that boards having uniform increments of thickness may be cut by use of the set works of this invention. Because the arc of travel of yoke 28 is controlled by the linear travel of piston 36, adjustable stops 46 must be non-uniform in thickness to compensate for the differential in the ratio of arc-to-linear movement, i.e. the sine of the angle between yoke 28 and piston rod 36.

The provision of either combination of idler gear 19, restraining gear 25 and pawl 27, or of idler gear 19 and clutch 26 would be sufficient to render the set works of this invention operable. It has been found, however, that greater precision and a continuous selection of settings can be obtained by providing both restraining gear 25 and clutch 26 in addition to idler gear 19. Restraining gear 25 is provided only as a means of restraining idler gear 19 and is not provided to function as a rachet. However, since conventional set works are often equipped with a rachet and pawl, the adaptation of clutch 26 to conventional set works is simplified by retaining the conventional rachet and pawl as restraining gear 25 and pawl 27 than is the adaptation of a gear restraining member of another design. Therefore, the provision of both a clutch member and a restraining gear is preferred.

Figure 3:
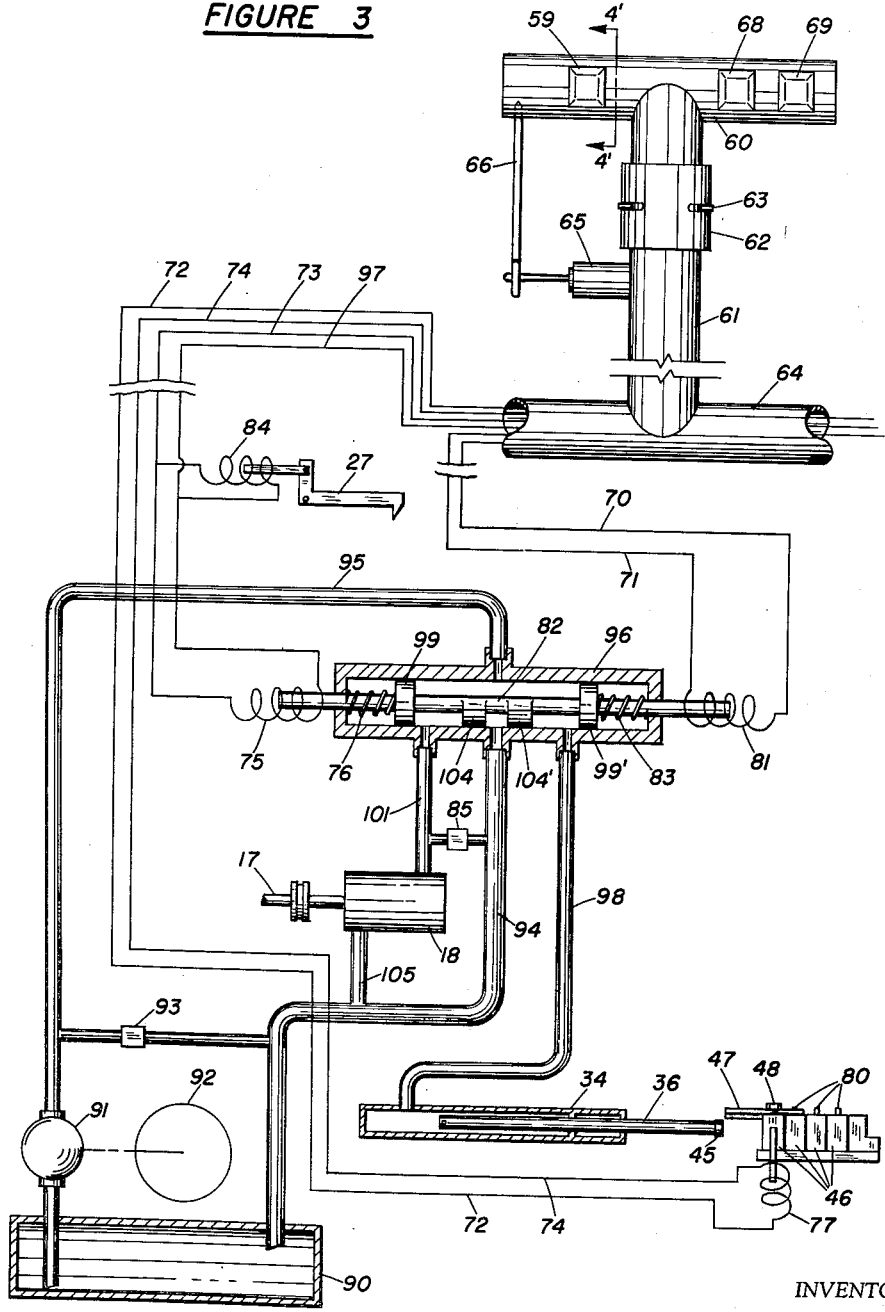
FIGURE 3 is a schematic view of a servo-mechanism of this invention.

In FIGURE 3 is shown a schematic view of the control mechanism of the set works of this invention. Handle 60 may be rotatably affixed to shaft 61 by means of collar 62 and may be rotated in a limited manner on shaft 61. Twistable movement of T-bar handle 60 on shaft 61 may be used to control movement of log clamping dogs of a type which are conventionally used on sawmills to grip unto and to restrain a saw log from movement on a carriage. Shaft 61 may be a control lever for controlling movement of the sawmill carriage. Whereas rotative movement of shaft 61 about transverse base shaft 64 may be used to control the movement of the sawmill carriage. Dog control switch 65 on shaft 61 may be actuated by twisting T-bar handle 60 so that depending finger 66 thereon contacts switch 65 and actuates it so that a log may be dogged down or released on the carriage.

Depressable switch button 68 may be operably connected to a toggle switch in T-bar handle 60 in the circuit comprised of electric lines 70 and 71 and of solenoid 81. Solenoid 81 may control movement of valve member 82 in hydraulic valve 96 to the right as shown in FIGURE 3 and enable fluid to be transferred to and from hydraulic line 98 and cylinder 34. Upon depressing switch button 68 the circuit may be closed and solenoid 81 may be actuated. Valve 82 may thereby be moved to the right and fluid may be enabled to enter into hydraulic line 98 and cylinder 34 thereby causing piston rod 36 to be extended to abut against adjustable stops 46. When switch button 68 is released piston rod 36 may be retracted by means of spring 13 (FIGURE 1).

Depressable switch button 69 may be connected into the circuit comprised of electric leads 72 and 74 and of solenoid 77. When switch button 69 may be depressed the circuit may be closed and solenoid 77 may be actuated, thereby removing one or more adjustable stops 46 from alignment with ram end 45 of piston rod 36. Bar 47 may be connected across two or more adjustable stops 46 by being contacted with upstanding studs 80 on each of said stops. Actuation of solenoid 77 will then remove a multiple number of stops from alignment with piston rod 36.

Depressable switch button 59 may be connected into the circuit comprised of electric leads 73 and 97 and of solenoids 75 and 84. Solenoid 75 may control movement of hydraulic valve member 82 to the left as viewed in FIGURE 3 and the flow of hydraulic fluid to hydraulic motor 18. Hydraulic motor 18 may freely rotate under actuation from set shaft 17 and act as a pump to circulate hydraulic fluid through hydraulic lines 105 and 94 to circulate the fluid through control valve 96. By depressing switch button 59 the circuit may be closed and solenoid 75 may be actuated to move hydraulic valve member 82 to the left, as viewed in FIGURE 3, to a position which actuates hydraulic motor 18. Upon release of switch button 59 spring 76 may return hydraulic valve member 82 to unactuated position thereby enabling motor 18 to idle under actuation from set shaft 17.

Solenoid 84 is connected in the same circuit in parallel with solenoid 75 and pawl 27 may be coupled to the operation of hydraulic motor 18 and be lifted out of operable engagement with restraining gear 25 when the circuit is closed.

Pressure relief valves 85 and 93 may be provided in the hydraulic system. Valve 85 may preferably be set to release at a lower pressure than valve 93 to enable rotation of set shaft 17 (FIGURE 1) to occur when piston rod 36 is extendably actuated. It has been found that release pressure settings of 500 pounds per square inch for valve 85 and 1000 pounds per square inch for valve 93 are adequate for satisfactory operation of the setworks when the piston in hydraulic cylinder 36 has a 1.5 inch diameter and works through a moment arm approximately five times longer than the radius of pinions 15, (FIGURE 1). When valve 85 is in unactuated position as shown in FIGURE 3, hydraulic fluid may be freely circulated substantially unpressurized and thereby minimize the power requirements for pumping the hydraulic fluid. Any other valve means which may be operable may also be used, the particular configuration being that of a conventional valve.

Figure 4:
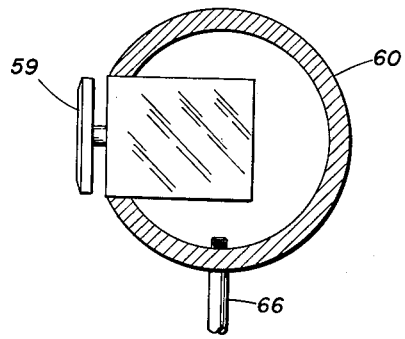
FIGURE 4 is a cross-sectional view of the control handle of FIGURE 3 along cutting plane 4'—4'.

In FIGURE 4 is shown a cross-sectional view of T-bar handle 60 of FIGURE 3. The switches that are provided in handle 60 are preferably of a toggle type wherein contact of a switch member is positively by snap action accomplished by means of spring actuation.

In FIGURE 5 is shown a modified embodiment of the mechanism of FIGURES 1 and 2 wherein yoke 28 and the machine components that are mounted thereon are engaged with drive gear 16 in a manner identical to that shown in FIGURES 1 and 2. A stationary yoke 110 of similar design to yoke 28, but fixedly attached to frame member 11, is also provided. Stationary yoke 110 may have mounted thereon an arrangement of gears and a clutch mechanism identical to that on movable yoke 28, viz. idler gear 111, clutch 112, restraining gear 113, and pawl 114. Solenoid 115 may be operably positioned to move pawl 114 out of engagement with restraining gear 113 in a manner which may be identical to that shown for pawl 27 and solenoid 56. Stationary yoke 110 may be provided to prevent rotative movement of drive gear 16 during the period of time that yoke 28 is being moved into retracted position. If the weight of a log resting against log positioning knees 12 might be sufficient to displace knees 12 while yoke 28 is being retracted there would be no restraining force present to prevent movement of drive gear 16. Therefore, a fixed yoke and gear arrangement may be provided to operably restrain movement of drive gear 16 while yoke 28 is being retracted into unactuated position. Pawl 114 of FIGURE 5 may be operably actuated with the circuit controlling motor 18, and it does not require individual actuating means.

Adjustable clamp 117 may be used to adjust the position of collar 38 on yoke 28. Clamp 118 on frame 119 may be used to limit the arc through which yoke 28 may be displaced. Clamps 117 and 118 are shown with set screw fastening means and are provided to enable the set works to be adapted for use with various sizes of pinion gears and for use to limit movement of yoke 28 when thin boards are being cut. An adjustment of collar 38 will be necessary to obtain uniform widths of cuts for any particular setting of stops 46 for use on different mills. If thin sections are to be cut, movement of yoke 28 can be restricted to enable only partial retraction of piston rod 36 to be made by providing clamp 118 in a position for intercepting movement of yoke 28.

Figure 6:
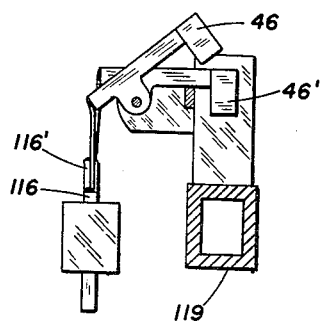
FIGURE 6 is a sectional front elevation of the adjustable stops embodied in FIGURE 5.

In FIGURE 6 are shown adjustable stops 46 and 46' and solenoids 116 and 116' of FIGURE 5. Each solenoid may be fixedly attached to any one of several adjustable stops 46, and any number of solenoids may be provided, each having a separate control button in handle 60. If it is desired to cut lumber of varying widths, for example, the sawyer has merely to successively cut one width of board with all stops 46 in place, cut a thinner width of board by removing a stop 46, or cut an even thinner width of board by removing a multiple number of stops 46. An additional switch in handle 60 must be provided to control the additional solenoid 116' of FIGURE 6, but is not separately shown.

The gear and clutch mechanism on stationary yoke 110 is similar to that disclosed on yoke 28. A simplified construction may be effected with the arrangement as may be effected with that arrangement on yoke 28, but it is preferred to retain the clutch mechanism shown in FIGURE 5 to obtain optimum functionability and positive operation of the set works, the operation of the clutch being continuous in comparison to the discontinuous operation of another construction such as a ratchet wheel.

The control system of this invention may be pneumatically actuated if it may be desired, and it is contemplated that piston 34 may be replaced by a double acting piston in other embodiments of the invention thereby eliminating the need for spring 13 and motor 18. It is possible to provide various arrangements of control valves to operably control the set works of this invention, and it is possible to provide numerous configurations of ratchets, overriding clutches and adjustable stops. It is also possible to replace hydraulic piston 34 and piston rod 36 by a reversible electric or fluid motor and a rack which may be affixed to yoke 28 and may be operably engaged with a motor driven pinion.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:
1. In a sawmill set works of the type described in juxtaposition with a sawmill set shaft and drive gear fixedly attached thereto the combination of a member rotatively mounted on said set shaft and radially extending therefrom adjacent to said drive gear mounted on said radially extending member, a restraining gear and a pawl operably mounted on said radially extending member both said restraining gear and said pawl being fixedly coupled with said drive gear in at least one direction of rotation of said drive gear, said drive gear and said set shaft being rotatable in said one direction of rotation by movement of said radially extending member, said restraining gear comprising a gear portion operably engageable with said drive gear and a ratchet portion operably engageable with said pawl, said ratchet portion and pawl enabling said gear portion to be rotated in said one direction by movement of said lever member rotatively about said set shaft, providing and preventing said gear portion from being rotated in the opposite direction of rotation by counter movement of said member.

2. In a sawmill set works of the type described the combination with a sawmill set shaft and drive gear fixedly attached thereto of a member rotatively mounted on said set shaft and radially extending therefrom adjacent to said drive gear, a restraining gear rotatively mounted on said member and operably coupled to said drive gear through fixed attachment with one member of an overriding clutch, an idler gear fixedly attached to a second member of said clutch, releasable means engageable with said idler gear for preventing rotation of said idler gear in one direction, said restraining gear, overriding clutch, idler gear and releasable means being affixed to said radially extending member so as to be carried with said member around said shaft, said drive gear being rotatable in one direction of rotation by movement of said member, said drive gear not being rotatable in an opposite direction of rotation by counter rotative movement of said member.

3. In a remotely controlled sawmill set works of the type described comprising a set shaft and a drive gear thereon, the combination of a pressurized prime moving fluid, a piston and rod in a fluid containing cylinder, said piston and rod being operably coupled to a support member, said support member being rotatably affixed to the set shaft of the sawmill, said support member being operably rotated about said set shaft by movement of said piston and rod, movement of said support member about said set shaft being limited by removable stops interposed in the path of travel of the assembly of said piston and rod and said support member, said removable stops being individually displaceable from said path of travel to enable said support member to traverse variable degrees of rotation about said set shaft, a pinion gear rotatively mounted on said support member in meshing relation with said drive gear, an overrun clutch affixed to said pinion gear and to said support member, releasable means on said support member for uncoupling said overrun clutch from at least one of said support member and pinion gear, at least one frame member disposed substantially transverse to said set shaft, said piston and rod in a fluid containing cylinder and said removable stops being mounted on said transverse frame member, said set shaft being disposed in immediate adjacency to said frame member and supported thereat by a chassis common thereto, said set shaft and said frame member thereby being rendered relatively rigid one to the other.

4. In a sawmill set works, the combination comprising a rotatable set shaft and drive gear fixed thereto, a pressurized prime moving fluid-containing cylinder, a piston and rod in said fluid-containing cylinder, a lever member journaled on said set shaft, said piston and rod being operably connected to said lever member, movement of said lever member about said set shaft being limited by removable stops disposed in the path of travel of said connected lever member, piston and rod, said removable stops being selectively removable from said path of travel to enable said lever member to traverse variable degrees of rotation about said set shaft, releasable means carried by said lever member for coupling movement of said lever member to movement of said set shaft in one direction of rotation, said releasable means comprising a gear mounted on said lever member in meshed relation with said drive gear together with a ratchet, pawl and override clutch fixedly attached to and juxtaposed between said gear and on said lever member and said ratchet, said ratchet being engageable with said pawl, said releasable means being carried by said lever member to enable said set shaft and said lever member to be operably coupled and de-coupled in one direction of rotation.

5. In a remotely controlled sawmill set works of the type described, the combination of a pressurized prime moving fluid, a piston and rod in a fluid containing cylinder, said piston and rod being operably coupled to a support member, said support member being rotatable around the set shaft of the sawmill by movement of said piston and rod, rotation of said support member being limited by removable stops interposed in the path of travel of said support member, said removable stops being individually displaceable from the path of travel of said support member to enable said support member to traverse variable degrees of rotation, releasable means on said support member for coupling rotation of said support member to rotation of said set shaft, said releasable means comprising an idler gear in meshed relation with a drive gear, said drive gear being affixed to said set shaft, an override clutch fixedly attached to and juxtaposed between said idler gear and a restraining gear, said restraining gear being engageable with pawl means on said support member, a set works control mechanism comprising a twistable handle with depressable switch buttons therein, said twistable handle being affixed to a carriage control lever means, twistable movement of said handle controlling log holding means, said buttons being disposed in said handle so that the fingers of one hand of a sawyer can depress said switch buttons to control said set shaft movement and selection of said adjustable stops.

6. In combination, a log carriage equipped with means including a set shaft which is rotatable for effecting the off-setting of a log as disposed on the carriage to various distances in accordance with the extent of rotation of said set shaft and a set works mechanism mounted on the carriage, said set works mechanism comprising a motor operably coupled to said set shaft, a drive gear fixedly mounted on said set shaft, a yoke member rotatively mounted on said set shaft by bearing means on either side of said drive gear, an idler gear in meshing relationship with said drive gear, a restraining gear, a restraining member for restraining rotation of said idler gear and said restraining gear, said idler gear and said restraining member being rotatively mounted on said yoke member and being operably coupled in one direction of rotation by an overriding clutch therebetween, a releasable pawl affixed to said yoke member in operable relation to said restraining gear, piston means affixed to said yoke member for operably rotating said yoke member about said set shaft, a plurality of selectively operable stops for limiting rotative movement of said yoke member, said set works mechanism being operable by rotating and counter rotating said yoke member by said piston means, said yoke member movement effecting stepwise rotation of said drive gear and said set shaft, said motor and said releasable means being actuatable to counter-rotate said set shaft.

7. The device of claim 6 wherein said adjustable stops are pivotally mounted in immediate adjacency one to another so as to be removable by solenoid means from alignment with said yoke affixed piston means.

8. The device of claim 6 wherein said piston means comprises a single acting hydraulic piston and cylinder, a piston rod being attached to said yoke.

9. In combination, a log carriage equipped with means including a set shaft that is rotatable for effecting the off-setting of a log as disposed on the carriage to various distances in accordance with the extent of rotation of said set shaft and a set works mechanism mounted on the carriage, said mechanism comprising a motor operably coupled to said set shaft, a drive gear fixedly mounted on said set shaft, a yoke member rotatively mounted on said set shaft by bearing means on either side of said drive gear, an idler gear in meshing relationship with said drive gear and a restraining gear, said idler gear and restraining gear being rotatively mounted on said yoke member and being operably coupled to an overriding clutch therebetween, a releasable first pawl affixed to said yoke member in operable relation to said restraining gear, piston means affixed to said yoke member for operably rotating said yoke member about said set shaft, a plurality of selectively operable stops for limiting movement of said yoke member, a fixed shaft mounted idler gear and restraining gear with an overriding clutch therebetween, said fixed shaft mounted idler gear being in operable engagement with said drive gear, said fixed shaft mounted restraining gear having a releasable second pawl in operable relation thereto, said set works mechanism being operable by rotating and counter-rotating said yoke member by said piston means, said yoke movement effecting stepwise rotation of said drive gear and said set shaft, said motor and said first and second releasable pawls being actuatable to counter rotate said set shaft.

10. The device of claim 9 wherein said adjustable stops are pivotally mounted in immediate adjacency one to another so as to be removable by solenoid means from alignment with said yoke affixed piston means.

11. The device of claim 9 wherein said piston means comprises a single acting hydraulic piston and cylinder, a piston rod being attached to said yoke.

12. In combination, a log carriage equipped with means including log dogging means and with head blocks and knees for the outsetting and retractive movements of a log as disposed on a carriage, a set shaft that is rotatable in one direction for effecting the advance movement of the knees for the outsetting of a log as disposed on the carriage to various distances in accordance with the extent of rotation of said set shaft and rotatable in the opposite direction to retract the knees toward starting position, a set works mechanism mounted on said carriage, said set works comprising a motor coupled to said shaft, a drive gear affixed to said set shaft, a radially extending member rotatively mounted on said set shaft, a restraining gear with pawl attachment and an idle gear coaxially rotatively mounted on said radial member and interconnected by attachment to an overriding clutch member therebetween, said idle gear being geared to said drive gear, a fixed position assembly of a second restraining gear and pawl attachment, a second idle gear and a second overriding clutch therebetween, said second idle gear being geared to said drive gear, a fluid actuated yoke apparatus pivotally affixed to said carriage comprising a single acting piston and rod adjustably affixed to said yoke by pivotal connection thereto, a plurality of removable stops for limiting the movement of said piston and rod, adjustable stops for limiting the movement of said yoke, said piston and rod being extendable to contact one of said removable stops and being retractable by spring actuation to rotate said yoke against one of said adjustable stops, a control means comprising a handle with a switch for controlling actuation of said motor to retract said head blocks by rotating said set shaft and for removing said two pawls from engagement with said two restraining gears by solenoid means, a second switch in said handle for actuating said fluid to extend said piston and rod, at least a third switch in said handle to actuate solenoid means for moving said removable stops, a fluid pumping system operably connected to fluid actuated set works components, electric supply operably connected to said set works electrical system components.

13. The device of claim 12 wherein said handle is operably connected to control movement of said carriage and said log dogging means.

References Cited in the file of this patent

UNITED STATES PATENTS

| | | |
|---|---|---|
| 374,511 | Willet | Dec. 6, 1887 |
| 698,243 | Barker et al. | Apr. 22, 1902 |
| 796,925 | McDermott | Aug. 8, 1905 |
| 817,888 | Trout | Apr. 17, 1906 |
| 857,663 | Osburn | June 25, 1907 |
| 2,125,371 | Field | Aug. 2, 1938 |
| 2,707,501 | Craik | May 3, 1955 |